United States Patent Office 3,317,387
Patented May 2, 1967

3,317,387
METHOD OF REDUCING THE SEVERITY OF INFLUENZA VIRUS INFECTIONS
William W. Prichard, Hockessin, Del., assignor to E. I. du Pont de Nemours and Company, Wilmington, Del., a corporation of Delaware
No Drawing. Filed May 25, 1964, Ser. No. 370,064
9 Claims. (Cl. 167—65)

This invention relates to new chemical compounds which may be regarded as amine derivatives of 4,7-ethano-3a,4,5,6,7,7a - hexahydroindane. The invention is also concerned with pharmaceutical compositions containing the new amine derivatives.

The compounds of the invention can be considered as those having the general formula

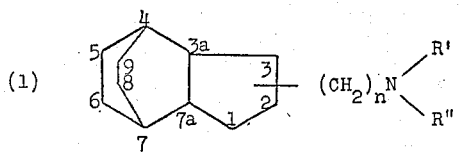

and their salts, where $n$ is 0 or 1 and R' and R'' are the same or different and, taken separately, represent hydrogen; lower alkyl, i.e., of up to 6 carbons and advantageously having 1 to 4 carbon atoms, including lower cyclic alkyl, preferably cyclopropyl and cyclobutyl; alkenyl or alkynyl of up to 6 carbon atoms; substituted alkyl having a total of up to 6 carbons where the substituent is hydroxy, alkoxy, amino or substituted amino, e.g., dialkylamino and, taken together, represent a 3 to 7-membered ring in which the amine nitrogen is an integral part of the ring. Also included are the aldehyde derivatives of primary amines, i.e., —(CH$_2$)$_n$N=CHR''' where R''' is an aliphatic or aromatic hydrocarbon of up to 12 carbons. In these compounds, the amine groupings

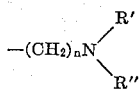

and —(CH$_2$)$_n$N=CHR''' may be attached at any position on the fused rings. It will be noted that the following positions are equivalent (when the rings are unsubstituted): 1 and 3, 3a and 7a, 4 and 7, 5 and 6, and 8 and 9.

Since the compounds of Formula 1 contain a basic amine group, they form salts with acids and such nontoxic salts are included within the scope of this invention. The nontoxic salts enhance the pharmaceutical application of the compounds. Representative of such salts are the hydrochloride, hydrobromide, sulfate, phosphate, acetate, lactate, succinate, propionate, pamoate, tartrate, salicylate, citrate and bicarbonate. Of these, the hydrochloride and acetate are preferred. Other salts include those with caprochlorone and with penicillin.

Particularly preferred compounds are those of Formula 1 wherein R' and R'' are taken from the group consisting of hydrogen and alkyl of 1 to 2 carbon atoms.

The compounds of this invention can be prepared by any of several methods. The parent hydrocarbon skeleton is readily prepared by the Diels-Alder condensation of 1,3-cyclohexadiene (obtainable from the sodium reduction of benzene) with 2-cyclopentenone, followed by reduction to 4,7-ethano-3a,4,5,6,7,7a-hexahydroindan-1-one. This ketone, upon hydrogenation in the presence of Raney nickel catalyst and excess ammonia, yields 1-amino-4,7 - ethano - 3a,4,5,6,7,7a - hexahydroindane. The 1-N-alkylamino derivatives can be synthesized from 4,7-ethano - 3a,4,7,7a - tetrahydroindan - 1 - one, the product of the above-mentioned Diels-Alder reaction, by hydrogenation in the presence of Raney nickel catalyst and the appropriate alkylamine.

To place the amino function on the 5-position, one may proceed through the synthesis of bicyclo(6.1.0)-nona-2,-4,6-triene, prepared from 1,3,5,7-cyclooctatetraene, and reacting the triene with acrylic acid to give a 4,7-ethano-3a,4,7,7a-tetrahydroindene-5-carboxylic acid, which upon hydrogenation gives the saturated acid. The acid is converted to the corresponding amine by conventional methods, e.g., the Schmidt reaction. This and any other of the acids whose preparation is set forth in the examples which follow can be converted to any desired amide and reduced with lithium aluminum hydride, LiAlH$_4$, to the corresponding —CH$_2$—NR$_2$ derivative.

Similarly, any —NHR derivative can be made by acylation of the amine followed by LiAlH$_4$ reduction. Additional —NR$_2$ derivatives can be made by reaction of the amine with RI to give —NR$_3$I derivatives which, on heating with NH$_2$CH$_2$CH$_2$OH are converted, in good yield, to —NR$_2$ compounds.

The preparation of the salts of compounds of Formula 1 can be carried out by dissolving the compound in a suitable solvent such as, for example, water, ethyl ether and the like, containing 1 or more equivalents of an acid. The resulting material can be concentrated in vacuo at moderate temperatures to yield a solid salt composition such as, for instance, the hydrochloride.

The compounds of this invention have broad antiviral effectiveness as illustrated by activity in tissue culture tests, chick embryo tests, and in mice against such influenza as Influenza A (S–15), Influenza A-2 (Michigan A/AA), and Parainfluenza (Sendai). More will be said about the antiviral activity of the compounds following the detailed preparative examples which are inserted here to further explain the present invention. These examples are not to be construed as limiting, in any way, the scope of the invention.

Example I

A mixture of 20 parts of 80% pure 1,3-cyclohexadiene and 17.5 parts of 2-cyclopentenone was heated in a sealed vessel at 160° C. for 24 hours. By distillation of the reaction mixture, 7.0 parts of 4,7-ethano-3a,4,7,7a-tetrahydroindan-1-one, B.P. 101–102°/4.7 mm., $n_D^{24}$ 1.5179 was obtained or 35.7% of theory. This was reduced in ethanolic solution, using a PtO$_2$ catalyst at 40 lb./in.$^2$ hydrogen pressure. The product isolated by distillation was 4,7 - ethano-3a,4,5,6,7,7a - hexahydroindan - 1 - one, a white solid, B.P. 69–70°/0.45 mm., M.P. 41–42°.

A solution of 12.1 parts of 4,7-ethano-3a,4,5,6,7,7a-hexahydroindan-1-one in ethanol, 55 parts, was charged into a stainless-steel-lined autoclave. After addition of 2 parts of Raney nickel catalyst, the autoclave was sealed and 10 parts of ammonia distilled into the vessel. The autoclave was heated, with agitation, at 125° C. and 1500 lb./in.$^2$ hydrogen pressure for 4 hours, cooled and the contents discharged. After filtration and removal of the solvent under reduced pressure, the residue was dissolved in dry diethyl ether and the solution saturated with dry hydrogen chloride. A solid precipitated (2.0 parts) which was recrystallized from a mixture of chloroform and ethyl acetate. This was identified as the hydrochloride of 1-amino - 4,7 - ethano - 3a,4,5,6,7,7a - hexahydroindane, M.P. 257–259°.

Analysis.—Calcd. for C$_{11}$H$_{20}$NCl: C, 65.70; H, 10.00; N, 6.95. Found: C, 65.82; H, 10.18; N, 6.92.

The infrared spectrum and NMR spectrum were consistent with the expected structure.

Evaporation of the ether solution, after hydrogen chloride treatment, gave 5.7 parts of a white solid, which could be recrystallized from petroleum ether, M.P. 62–64°. This is the hydrochloride of the secondary amine resulting from reaction of two moles of the ketone with one mole of ammonia, or bis(4,7-ethano-3a,4,5,6,7,7a-hexahydroindan-1-yl)-amine hydrochloride.

*Example II*

A solution of 10 parts of 4,7-ethano-3a,4,7,7a-tetrahydroindan-1-one in 40 parts of methanol and 20 parts of methylamine was placed in an autoclave, 5 parts of Raney nickel catalyst added, and the vessel sealed. The mixture was heated at 125° for 4 hours under a hydrogen pressure of 1500 lb./in.². After filtration of the solution and removal of the solvent under reduced pressure the product was distilled. A yield of 8.58 parts (76.6%) of 1-N-methylamino - 4,7 - ethano-3a,4,5,6,7,7a-hexahydroindane, B.P. 75° C./0.2 mm., $n_D^{27}$ 1.5123, was obtained. This was dissolved in n-hexane and the solution saturated with hydrogen chloride. The white, solid, amine hydrochloride obtained was recrystallized from a mixture of methanol and ethyl acetate as shining white plates, M.P. 229–230° C.

*Analysis.*—Calcd. for $C_{12}H_{22}NCl$: C, 67.00; H, 10.28; N, 6.52. Found: C, 67.02; H, 10.28; N, 6.41.

*Example III*

Sixty parts of metallic potassium was added slowly to a solution of 80 parts 1,3,5,7-cyclooctatetraene in tetrahydrofuran (1000 parts). The mixture was stirred for 2 hrs. and 107 parts of methylene chloride added, keeping the temperature of the mixture between 40–50° by gentle heating or cooling. The reaction mixture was allowed to cool to 30° and 80 parts of water added. The tetrahydrofuran was removed, under reduced pressure, and the residue extracted with ether. The extract was washed with water until the washings were neutral, dried, and the solvent removed. The residue was distilled at 32–34°/3 mm. to yield 53 parts of product which was predominantly bicyclo[6.1.0]nona - 2,4,6 - triene. The melting point of 7° C. and the refractive index ($n_D^{24}$ 1.5354) indicated slight contamination with isomeric bicyclo[4.3.0]nona-2,4,7-triene. Vogel [Tetrahedron Letters, 11, 673 (1963)] reports a melting point of 18–19° C. for pure bicyclo[6.1.0]nona-2,4,6-triene. The distillate was heated for 2 hours at 100° C. under a nitrogen atmosphere. The product was bicyclo[4.3.0]nona-2,4,7-triene, $n_D^{24}$ 1.5239. The crude product was mixed with an equimolar amount of glacial acrylic acid, and the mixture warmed for 2 hrs. at 100° C. The mixture was cooled, the solid removed by filtration and recrystallized from acetonitrile. This gave a 52% yield of 4,7-ethano-3a,4,7,7a-tetrahydroindene-5-carboxylic acid, M.P. 142–143° C. K. Alder and F. H. Flock [Chemische Ber., 87, 1816 (1954)] report a melting point of 147° for this compound. The acid was reduced in ethanol at 40 lb./in.² hydrogen pressure, using a PtO₂ catalyst. The resulting 4,7-ethano-3a,4,5,6,7,7a-hexahydroindane - 5 - carboxylic acid melted at 96° C. Five parts of this acid was dissolved in 75 parts of acetone and 2.13 parts of pyridine added. A solution of 2.55 parts of methyl chloroformate in 15 parts of acetone was added at 5° C. After stirring for 1 hr., a solution of 1.84 parts of sodium azide in 15 parts of water was added, the mixture stirred for 2 hrs. and diluted with 200 parts of water. The mixture was extracted with toluene, the toluene extract washed with water, dried over sodium sulfate and the dry solution heated at 100° until no more nitrogen was evolved. The toluene was then removed, under reduced pressure, and the crude 4,7-ethano-3a,4,5,6,7,7a-hexahydroindane-5-isocyanate converted to the corresponding methyl urethane by refluxing the compound with an excess of methanol for 16 hrs. The methanol was removed and the resulting urethane hydrolyzed to 5-amino-4,7-ethano - 3a,4,5,6,7,7a - hexahydroindane by refluxing with powdered KOH in diethylene glycol for 8 hours. The solution was diluted with 200 parts of H₂O and extracted with diethyl ether. The ethereal extract was dried over sodium hydroxide pellets and saturated with dry hydrogen chloride. A precipitate of 5-amino-4,7-ethano-3a,4,5,6,7,7a-hexahydroindane hydrochloride, M.P. 352–353° C., formed.

*Analysis.*—Calcd. for $C_{11}H_{20}NCl$: C, 65.70; H, 10.00; N, 6.95. Found: C, 65.36; H, 10.07; N, 6.56.

*Example IV*

Twenty parts of 5-amino-4,7-ethano-3a,4,5,6,7,7a-hexahydroindane hydrochloride, as prepared in Example III was dissolved in 100 parts of methanol and one molar equivalent (12.1 parts) of allyl bromide plus 3 molar equivalents (25.2 parts) of sodium bicarbonate was added. The mixture was refluxed for 24 hrs., at which time no more carbon dioxide evolution was noted. The mixture was filtered and the filtrate concentrated under reduced pressure at 100° C. The residue was dissolved in ether and the solution dried with sodium hydroxide pellets. The solution was saturated with hydrogen chloride and the precipitated amine hydrochloride recrystallized from etheyl acetate. The bulk of the product was 5-N-allylamino - 4,7-ethano-3a,4,5,6,7,7a-hexahydroindane-hydrochloride. A small amount of 5-N,N-bis-allylamino-4,7-ethano-3a,4,5,6,7,7a-hexahydroindane hydrochloride was isolated as the more soluble portion of the reaction mixture.

*Example V*

1,3-cyclohexadiene-1-carboxylic acid ethyl ester (15.3 parts) prepared by the method of C. H. Grob, Helv. Chim. Acta 41, 1191 (1958) was heated with 2 molar equivalents (13.2 parts) of freshly distilled cyclopentadiene in a sealed vessel at 150° C. for 16 hrs. An ethanol solution of the product was hydrogenated, using a PtO₂ catalyst, at 40 lb./in.² hydrogen pressure. Distillation of the hydrogenated material gave 4-carbethoxy-4,7-ethano-3a,4,5,6,7,7a-hexahydroindane, B.P. 111.5°/1.8 mm. Alkaline hydrolysis gave the corresponding 4-carboxy-4,7-ethano-3a,4,5,6,7,7a-hexahydroindane, M.P. 117°. This was converted, without purifiction to 4,7-ethano-3a,4,5,6,7,7a-hexahydroindan-4-yl methylurethane by the modified Curtius reaction described in Example III for the conversion of the 5-carboxy isomer to the corresponding urethane. The urethane, on alkaline hydrolysis, gave the 4-amino-4,7-ethano-3a,4,5,6,7,7a - hexahydroindane, which was isolated as the hydrochloride, M.P. 333–335°.

*Analysis.*—Calcd. for $C_{11}H_{20}NCl$: C, 65.70; H, 10.00; N, 6.95. Found: C, 65.43; H, 9.76; N, 6.83.

The structure of this compound was proven by an alternate synthetic route.

*Example VI*

Five parts of the 4,7-ethano-3a,4,5,6,7,7a-hexahydroindan-4-yl methylurethane of Example V was dissolved in dry diethyl ether and added to a two-fold excess of LiAlH₄ suspended in dry ether. After complete addition, the mixture was heated under reflux for 1 hr., cooled, and 10 parts of a saturated aqueous solution of sodium sulfate added. The mixture was filtered, the filtrate dried with sodium hydroxide pellets, and saturated with hydrogen chloride. White crystals of 4-N-methylamino-4,7-ethano-3a,4,5,6,7,7a-hexahydroindane hydrochloride precipitated.

*Example VII*

Five parts of the 4-amino-4,7-ethano-3a,4,5,6,7,7a-hexahydroindane-hydrochloride was dissolved in methanol and one molar equivalent of methallyl bromide plus 3 molar equivalents of sodium bicarbonate added. The mixture was heated under reflux for 24 hours, filtered and the alcohol removed. The residue was taken up in ether, dried with sodium hydroxide and saturated with hydrogen chloride. The 4-N-methallylamino-4,7-ethano-3a,4,5,6,7,7a - hexahydroindane hydrochloride obtained was purified by recrystallization from ethyl acetate.

Example VIII

Ten parts of 5-carboxy-4,7-ethano-3a,4,5,6,7,7a-hexahydroindane of Example III was heated under reflux with 5 molar equivalents of $SOCl_2$ until no more gas evolution was noted. The excess $SOCl_2$ was removed at 100° and 20 parts of dry benzene added and distilled off to remove the last traces of $SOCl_2$. The residue was taken up in dry ether and anhydrous $NH_3$ passed into the vessel until an excess was present. The ether was removed by distillation and the solid residue triturated with water. This left nearly pure 4,7-ethano-3a,4,5,6,7,7a-hexahydroindane 5-carboxamide. The amide was thoroughly dried under vacuum and without further purification dissolved in dry ether and added to a two-fold excess (4.1 parts) of $LiAlH_4$. After complete addition the mixture was heated under reflux for 1 hr. and 20 parts of saturated, aqueous sodium sulfate solution added slowly. The mixture was separated by filtration into a filtrate and a solid residue. The filtrate was dried with sodium hydroxide pellets and saturated with hydrogen chloride. A precipitate of 5-aminomethyl-4,7-ethano-3a,4,5,6,7,7a-hexahydroindane hydrochloride formed. This was purified by recrystallization from ethyl acetate plus a little methanol, M.P. 296–297°.

In a similar manner, the acid chloride of 5-carboxy-4,7-ethano-3a,4,5,6,7,7a-hexahydroindane was treated with a molar equivalent of allylamine and the resulting amide reduced with lithium aluminum hydride to yield 5-N-allylaminomethyl-4,7-ethano-3a,4,5,6,7,7a - hexahydroindane which was isolated and purified as the hydrochloride.

Example IX

Ten parts of 4-carboxy-4,7-ethano-3a,4,5,6,7,7a-hexahydroindane of Example V was converted to the acid chloride by the procedure outlined in Example VIII. Two molar equivalents of diethylamine, in benzene solution, was added dropwise to a benzene solution of the crude acid chloride. After completion of the addition, the benzene was removed, under reduced pressure, and the solid residue triturated with water. The water insoluble N,N-diethylcarboxamide was dried thoroughly under vacuum and reduced by the procedure outlined in Example VIII, using 1.95 parts of $LiAlH_4$. The product was 4-(N,N-diethylaminomethyl)-4,7-ethano - 3a,4,5,6,7,7a - hexahydroindane hydrochloride, obtained as white crystals by saturating an ether solution of the free amine with hydrogen chloride. By an exactly analogous procedure, substituting di-n-butyl amine for diethylamine, the 4-(N,N-di-n-butylaminomethyl)-4,7-ethano - 3a,4,5,6,7,7a-hexahydroindane hydrochloride was obtained.

Example X

Twenty parts of 5-amino-4,7-ethano-3a,4,5,6,7,7a-hexahydroindane hydrochloride of Example III was dissolved in water, the solution made strongly basic with NaOH and the free amine extracted from the solution with 200 parts of ether. The ethereal solution was dried with NaOH pellets and diluted with twenty parts of pyridine. An ethereal solution of 11 parts of n-butyryl chloride was then added slowly, the mixture heated under reflux for 1 hour and cooled. The solution was washed thoroughly with water, then with dilute hydrochloric acid, again with water, and dried over anhydrous sodium sulfate. The colorless oil which remained after removal of the ether was 4,7-ethano-3a,4,5,6,7,7a-hexahydroindan-5-yl-n-butyramide. This was dissolved in dry tetrahydrofuran and added slowly to 7 parts of $LiAlH_4$ suspended in 200 parts diethyl ether. The reaction mixture was worked up according to the procedure of Example VIII to yield 5-(N-n-butylamino)-4,7-ethano-3a,4,5,6,7,7a - hexahydroindane hydrochloride.

Example XI

Ten parts of 4,7-ethano-3a,4,5,6,7,7a-hexahydroindan-1-one, prepared as described in Example I was dissolved in dry diethyl ether and added to a suspension of 2 parts of $LiAlH_4$ in diethyl ether. The mixture was heated under reflux for 1 hour, cooled, and 10 parts of a saturated aqueous solution of sodium sulfate added slowly. The solid which formed was removed by filtration and the filtrate dried with anhydrous sodium sulfate. Removal of the solvent gave 1-hydroxy-4,7-ethano-3a,4,5,6,7,7a-hexahydroindane, M.P. 77–78°. A solution of 5 parts of this alcohol in 10 parts of anhydrous formic acid was added slowly to 100 parts of 98% sulfuric acid, with good stirring, at 10–15° C. The reaction mixture was then poured on crushed ice, extracted with ether and the ethereal extract washed thoroughly with water. The ether solution was then washed with dilute sodium hydroxide solution until the washings were alkaline. The combined alkaline wash solution was acidified with hydrochloric acid. The solid, 3a-carboxy-4,7-ethano-3a,4,5,6,7,7a-hexahydroindane, M.P. 124–126°, which precipitated was converted to the corresponding methyl urethane by the modified Curtius rearrangement described in Example III. Alkaline hydrolysis of the 4,7-ethano-3a,4,5,6,7,7a-hexahydroindan-3a-yl methyl urethane gave 3a-amino-4,7-ethano - 3a,4,5,6,7,7a - hexahydroindane, which was isolated as the solid hydrochloride, melting above 410° C.

Example XII

Ten parts of the 3a-carboxy-4,7-ethano-3a,4,5,6,7,7a-hexahydroindane of Example XI was converted to the corresponding acid chloride by the procedure of Example VIII. The crude acid chloride was allowed to react, in ethereal solution, with a two-fold excess of n-propylamine. The ether solution was washed thoroughly with water and dried over sodium sulfate. The solution was then dropped slowly into a suspension of 3.9 parts of $LiAlH_4$ in dry ether. The product, isolated as outlined in Example VIII, was the hydrochloride of 3a-(N-n-propylaminomethyl)-4,7-ethano - 3a,4,5,6,7,7a - hexahydroindane.

Example XIII

Ten parts of 2,3-dicarbomethoxybicyclo[2.2.2]octane, prepared by the method of Kohlrausch, Seka and Tramposch, Chem. Ber. 75B, 1394 (1942), was added slowly to 2 parts of $LiAlH_4$ suspended in dry ethyl ether. After the addition was completed, the mixture was heated under reflux for 1 hr. and ten parts of a saturated aqueous sodium sulfate solution added slowly. The precipitated solid was removed by filtration, the filtrate dried was anhydrous sodium sulfate and the ether removed. The crude bicyclo[2.2.2]octane 2,3-dimethanol was dissolved in 50 parts of dry pyridine and 30 parts of freshly distilled tosylchloride dissolved in 50 parts of pyridine added dropwise at −5° C. The mixture was then poured on ice, acidified with sulfuric acid and the solid product isolated by filtration. The carefully dried ditosylate was dissolved in dry acetone, the calculated amount of sodium iodide added and the mixture heated in a sealed tube at 110–120° C. for 2 hrs. The tube was cooled, opened, and the sodium tosylate removed by filtration. The acetone solution of the 2,3-bis(iodomethyl)bicyclo[2.2.2]octane was concentrated under reduced pressure and the residue dissolved in diethyl ether. The ethereal solution was washed, until colorless, with sodium thiosulfate solution, dried over anhydrous sodium sulfate and the ether removed. The solid residue was taken up in ethyl alcohol, an excess of an aqueous KCN solution added and the mixture heated under reflux for 86 hrs. The alcohol was removed under reduced pressure and the residue taken up in diethyl ether and the solution washed thoroughly with water. Removal of the ether gave crude 2,3-bis(cyanomethyl)bicyclo[2.2.2]octane.

The dinitrile was dissolved in a mixture of 50 parts glacial acetic and 5 parts concentrated hydrochloric acid and heated under reflux for 5 hours. The resulting solution was diluted with a large volume of water. The solid 2,3 - bis(carboxymethyl)bicyclo[2.2.2]octane was isolated by filtration and purified by recrytsallization from acetonitrile. The barium salt of the diacid was prepared by dissolving the acid in the calculated amount of barium hydroxide solution and evaporating to dryness under reduced pressure. The dry barium salt was placed in a distilling vessel and heated with a free flame. The distillate was 4,7-ethano-3a,4,5,6,7,7a-hexahydroindan-2-one.

A solution of this ketone, in ethanol, was placed in a pressure vessel, with one part of Raney nickel catalyst for each ten parts of ketone, the vessel sealed and one part of ammonia per part of ketone distilled into the vessel. A hydrogen pressure of 1500 lb./in.$^2$ was impressed and the vessel heated with agitation to 150° C. The contents of the vessel were cooled, discharged, and the catalyst removed by filtration. The solvent was removed and replaced by diethyl ether. Dry hydrogen chloride was passed into the solution. A precipitate of 2 - amino - 4,7 - ethano - 3a,4,5,6,6a - hexahydroindane hydrochloride formed.

*Example XIV*

Ten parts of the 5-carboxy-4,7-ethano - 3a,4,5,6,7,7a hexahydroindane, as prepared in Example III, was converted to the acid chloride by the procedure described in Example VIII. The crude acid chloride, in 200 parts of ether, was treated with two molar equivalents of pyrrolidine. After the addition of the amine was completed, the solution was heated under reflux for 1 hr., cooled and extracted with water. The ether solution was then dried with Na$_2$SO$_4$ and added slowly to a suspension of 4 parts of LiAlH$_4$ in dry ether. The product was 5-(1-pyrrolidinylmethyl)4,7-ethano-3a,4,5,6,7,7a-hexahydroindane.

*Example XV*

Ten parts of 4,7-ethano-3a,4,5,6,7,7a-hexahydroindan-1-one, as prepared in Example I, 5 parts of cyclobutylamine (prepared according to Heisig, J. Am. Chem. Soc. 73, 3176 (1951) and 50 parts of ethanol are shaken, at 80° and 1500 lb./in.$^2$ hydrogen pressure in the presence of 5 parts of 10% Pd on charcoal catalyst, for 3 hrs. The pressure vessel is cooled, opened and the contents discharged. The catalyst is removed by filtration and the 1-cyclobutylamino-4,7-ethano-3a,4,5,6,7,7a - hexahydroindane isolated as the hydrochloride by the procedure of Example II.

*Example XVI*

The 3a-carboxy-4,7-ethano - 3a,4,5,6,7a-hexahydroindane of Example XI is converted to the acid chloride by heating 10 parts of the acid with 20 parts of thionyl chloride, removing the excess SOCl$_2$ under reduced pressure and distilling the acid chloride at 1 mm. pressure through a very short column. The distillate is then dissolved in dry pyridine and an ethereal solution of one equivalent weight of cyclopropylamine (prepared according to Roberts and Chambers, J. Am. Chem. Soc., 73, 3176 (1951) added slowly. The ether solution is washed with water, dilute hydrochloric acid and again with water and dried with anhydrous sodium sulfate. After removal of the solvent, solid 3a-(cyclopropylcarbamido)-4,7-ethano-3a,4,5,6,7,7a-hexahydroindane remains. Ten parts of this amide, dissolved in dry tetrahydrofuran is added to 2 parts of LiAlH$_4$ suspended in dry ether. The mixture is heated under reflux for 1 hr. and the product, 3a-cyclopropylaminomethyl-4,7-ethano - 3a,4,5,6,7,7a-hexahydroindane, isolated as the hydrochloride by the procedure described in Example VIII.

In place of pyrrolidine in Example XIV, when propyleneiminomethyl, piperidine and hexamethyleneimine are used, there are obtained, respectively, (2-1-propyleneiminomethyl)4,7-ethano - 3a,4,5,6,7,7a-hexahydroindane hydrochloride, 2 - (1 - piperidinomethyl) - 4,7 - ethano-3a,4,5,6,7,7a - hexahydroindane hydrochloride, and 2-(1-hexamethyleneiminomethyl)-4,7 - ethano - 3a,4,5,6,7,7a-hexahydroindane hydrochloride.

When propargyl chloride is substituted for allyl bromide in Example IV, the corresponding 5-N-propargylamino-4,7 - ethano-3a,4,5,6,7,7a - hexahydroindane hydrochloride is obtained. Similarly, reaction of 3-dimethylaminopropyl bromide, 4 - dimethylaminobutyl bromide, 2-chloroethanol, 2 - hydroxyethoxyethyl chloride, and 3 - methoxypropyl bromide with 4 - amino - 4,7 - ethano -3a,4,5, 6,7,7a - hexahydroindane hydrochloride according to the process of Example VIII gives the corresponding 4-N-dimethylaminopropylamino-4,7-ethano - 3a,4,5,6,7,7a-hexahydroindane hydrochloride, 4-N-4-dimethylaminobutylamino - 4,7 - ethano - 3a,4,5,6,7,7a - hexahydroindane hydrochloride, 4 - N - 2 - hydroxyethylamino - 4,7 -ethano-3a,4,5,6,7,7a - hexahydroindane hydrochloride, and 4 -N-3-methoxypropylamino - 4,7 - ethano - 3a,4,5,6,7,7a-hexahydroindane hydrochloride.

Aldehydes react with the primary amines of this invention, e.g., those of Examples I, III, V, VIII, or XI to give the corresponding alkylideneamino derivatives. Thus acetaldehyde, valeraldehyde, benzaldehyde, p-cyclohexylbenzaldehyde react with these amines to give the corresponding imino (Schiff base) derivatives which also have useful antiviral activity.

The hydrochlorides of the amino derivatives of 4,7-ethano-3a,4,5,6,7,7a-hexahydroindanes can serve as catalysts for the condensation of phenol with formaldehyde. For example, equimolar amounts of phenol and 37% aqueous formalin are mixed and an aliquot heated at 150° C. for two hours. No appreciable polymerization occurs. In contrast, similar aliquots to which addition of 0.1% by weight of the hydrochloride of either 1- or 5-amino-4,7-ethano-3a,4,5,6,7,7a-hexahydroindane has been made are converted to a colorless brittle resin by 2 hours heating at 150° C.

The antiviral activity of the amino derivatives of 4,7-ethano-3a,4,5,6,7,7a-hexahydroindane was measured by a variety of well-recognized tests. In one type of assay, influenza virus was inoculated into 9–10 day old embryonated eggs in such concentration that within two days a 100% mortality of the infected embryo was observed. Similar eggs were inoculated nearly simultaneously with a solution of the amine to be assayed and the same concentration of virus used in the controls.

The amines showed a marked protective effect. In a typical example, influenza virus, strain Jap 305, inoculated into embryonated eggs gave 100% kill in two days, while eggs receiving the same amount of virus and 500γ/egg of 1-amino-4,7-ethano-3a,4,5,6,7,7a-hexahydroindane hydrochloride, as prepared in Example I showed a 50% survival five days after inoculation. Eggs receiving virus and 500γ/egg of the 5-aminomethyl-4,7-ethano-3a,4,5,6, 7,7a-hexahydroindane hydrochloride, prepared in Example VIII, showed 40% survival after all control eggs receiving virus alone had died. Eggs receiving virus and 500γ/egg of the 5-amino-4,7-ethano-3a,4,5,6,7,7a-hexahydroindane of Example III showed 75% survival two days after complete kill of the controls.

Another method of antiviral assay, using several influenza strains in the mouse, has also been employed. The details of this assay will be published in Science in May, 1964. In brief, mice are injected, by nasal spray, with sufficient virus to cause complete mortality as well as with lower concentrations which cause partial fatalities. A calculation of the mean survival days for each virus dilution is then made. Comparison of the survival time of mice treated with a protective chemical with that of untreated controls permits a quantitative calculation of the reduction in infectivity of the virus, attributable to the protective effect of the compound.

When assayed by this quantitative and statistically significant test, 1-amino-4,7-ethano-3a,4,5,6,7,7a-hexahydroindane hydrochloride (Example I) caused a one-half log reduction in virus infectivity of Influenza A (S–15)

when injected into mice at a concentration of 14 mg./kg., of Influenza A-2 (Michigan A/AA) at concentrations of 12 mg./kg., and of Parainfluenza (Sendai) at 9.3 mg./kg.

Injection of 1-methylamino-4,7-ethano-3a,4,5,6,7,7a-hexahydroindane hydrochloride (Example II) at a concentration of 21 mg./kg. caused a one-half log reduction in virus infectivity of Influenza A (S-15).

Since a good correlation of anti-influenza activity as measured by the mouse assay and by clinical studies in human subjects has been found (Science, April 1964) for another antiviral amine, 1-aminoadamantane hydrochloride, the activity of the amino-4,7-ethano-3a,4,5,6,7,7a-hexahydroindanes in the mouse assay makes these compounds of great interest for use in controlling human influenza.

The compounds of Formula 1 above can be administered to warm-blooded animals in the antiviral treatment according to this invention by any means that effects contact of the active amino compound with the side of virus infection in the body. It will be understood that this includes the site prior to infection setting in as well as after. For example, administration can be parenterally, that is subcutaneously, intravenously, intramuscularly, or intraperitoneally. Alternatively or concurrently, the compounds are effective on administration by the oral route. Since the compounds are particularly effective against respiratory infections such as viral pneumonia, administration can be by vapor or spray through the mouth or nasal passages.

The compounds within the scope of this invention are valuable for viral prophylaxis, as well as for therapeutic treatment.

The dosage administered will be dependent upon the virus being treated, the age, health and weight of the recipient, the extent of infection, kind of concurrent treatment if any, frequency of treatment and the nature of the effect desired. Generally, a daily dosage of active ingredient compound will be from about 0.1 to 50 milligrams per kilogram of body weight, although lower, such as 0.01 milligram, or higher amounts can be used. Ordinarily, from 1 to 20 and preferably 1 to 10 milligrams per kilogram per day, in one or more applications per day, is effective to obtain the desired result.

The compounds of Formula 1, i.e., the active ingredient, can be employed in useful compositions according to the present invention in such dosage forms as tablets, capsules, powder packets or liquid solutions, suspensions, or elixirs, for oral administration, or liquid solutions for parenteral use, and in certain cases, suspensions for parenteral use (except intraveneous). In such compositions the active ingredient will ordinarily always be present in an amount of at least 0.5% by weight based on the total weight of the composition and not more than 90% by weight.

Besides the active ingredient of Formula 1, the antiviral composition will contain a solid or liquid nontoxic pharmaceutical carrier for the active ingredient.

In one embodiment of a pharmaceutical composition of this invention, the solid carrier is a capsule which can be of the ordinary gelatin type. In the capsule will be from about 30–60% by weight of a compound of Formula 1 and 70–40% of a carrier, such as lactose. In another embodiment, the active ingredient is tableted with or without adjuvants. In yet another embodiment, the active ingredient is put into powder packets and employed.

The pharmaceutical carrier can, as previously indicated, be sterile liquids such as water and oils, including those of petroleum, animal, vegetable, or synthetic origin, for example, peanut oil, soybean oil, mineral oil, sesame oil and the like. In general, water, saline and aqueous dextrose (glucose) and related sugar solutions and glycols such as propylene glycol or polyethylene glycol are preferred liquid carriers, particularly for injectible solutions. Sterile injectible solutions will ordinarily contain from about 0.5 to 25%, and preferably about 1 to 10% by weight of the active ingredient.

As mentioned above, oral administration can be in a suitable suspension or syrup, in which the active ingredient ordinarily will constitute from about 0.5 to 10%, and preferably about 2 to 5%, by weight. The pharmaceutical carrier in such compositions can be a watery vehicle such as a syrup or a pharmaceutical mucilage.

Suitable pharmaceutical carriers are described in "Remmington's Practice of Pharmacy" by E. W. Martin and E. F. Cook, a well-known reference test in this field.

While the above examples describe the preparation and antiviral activity of certain representative compounds illustrated by the structure in column 1, lines 16–24, it is to be understood that the invention is not to be limited by these examples or by the specific reaction conditions described for their preparation, but is understood to embrace variations and modifications falling within the scope of the appended claims.

The embodiments of the invention in which an exclusive property or privilege is claimed are defined as follows:

1. A compound selected from the group consisting of compounds of the formula

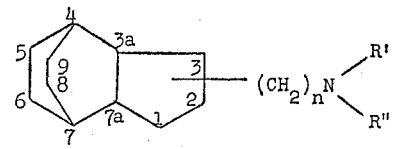

and salts of said compounds, where R' and R", taken separately, are selected from the class consisting of hydrogen, lower alkyl, lower alkenyl, lower alkynyl and substituted alkyl having a total of up to 6 carbons wherein the substituent is selected from the class consisting of hydroxy, alkoxy, amino and dialkylamino; and, when taken together with the amine nitrogen, is a 3 to 7-membered ring in which the amine nitrogen, the only hetero atom in the carbon ring, is an integral part of the ring; and R' and R" when taken together with the

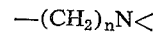

grouping is the —(CH$_2$)$_n$N=CHR''' group wherein R''' is a hydrocarbon of up to 12 carbons, and $n$ is a cardinal number of from zero to one.

2. 1 - amino - 4,7 - ethano - 3a,4,5,6,7,7a - hexahydroindane.

3. The hydrochloride of the compound of claim 2.

4. 1 - N - methylamino - 4,7 - ethano - 3a,4,5,6,7,7a-hexahydroindane.

5. The hydrochloride of the compound of claim 4.

6. 5 - amino - 4,7 - ethano - 3a,4,5,6,7,7a-hexahydroindane hydrochloride.

7. The process of reducing the severity of influenza virus infections in warm-blooded animals which comprises administration to said warm-blooded animals of a small but effective dose of an amine derivative of 4,7-ethano-3a,4,5,6,7,7a-hexahydroindane selected from the group consisting of those having the structural formula

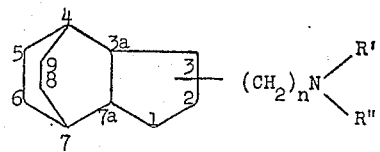

and nontoxic salts of said amine derivatives, where R' and R", taken separately, are selected from the class consisting of hydrogen, lower alkyl, lower alkenyl, lower alkynyl and substituted alkyl having a total of up to 6 carbons wherein the substituent is selected from the class consisting of hydroxy, alkoxy, amino and dialkylamino; and, when taken together with the amine nitrogen, is a 3 to 7-membered ring in which the amine nitrogen, the only hetero atom in the carbon ring, is an integral parts of the ring; and R' and R" when taken together with the —$(CH_2)_nN<$ grouping is the $-(CH_2)_nN=CHR'''$ group wherein $R'''$ is a hydrocarbon of up to 12 carbons, and $n$ is a cardinal number of from zero to one.

8. The process of claim 7 wherein the amine derivative in the form of its hydrochloride is administered at the rate of from about 0.1 to 200 mg. per kg. of body weight per day.

9. An antiviral composition in dosage unit form comprising a pharmaceutical carrier and from about 0.1 mg. to about 200 mg. of a chemical compound selected from the group consisting of those of the following formula and its nontoxic salts, said formula being

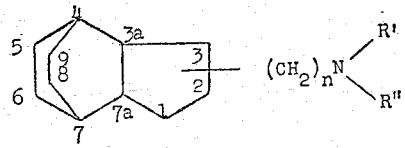

where $R'$ and $R''$, taken separately, are selected from the class consisting of hydrogen, lower alkyl, lower alkenyl, lower alkynyl and substituted alkyl having a total of up to 6 carbons wherein the substituent is selected from the class consisting of hydroxy, alkoxy, amino and dialkylamino; and, when taken together with the amine nitrogen, is a 3 to 7-membered ring in which the amine nitrogen, the only hetero atom in the carbon ring, is an integral part of the ring; and $R'$ and $R''$ when taken together with the $-(CH_2)_nN<$ grouping is the $$-(CH_2)_nN=CHR'''$$

group wherein $R'''$ is a hydrocarbon of up to 12 carbons, and $n$ is a cardinal number of from zero to one.

No references cited.

JULIAN S. LEVITT, *Primary Examiner.*

STANLEY J. FRIEDMAN, *Assistant Examiner.*